United States Patent [19]

Rihm et al.

[11] 4,073,473
[45] Feb. 14, 1978

[54] ROTARY VALVE

[75] Inventors: Herbert Rihm, Hanau; Walter Rogge, Erlensee, both of Germany

[73] Assignee: Honeywell G.m.b.H., Frankfurt am Main, Germany

[21] Appl. No.: 752,488

[22] Filed: Dec. 20, 1976

Related U.S. Application Data

[63] Continuation of Ser. No. 522,888, Nov. 11, 1974, abandoned.

[51] Int. Cl.$^2$ .............................................. F16K 1/16
[52] U.S. Cl. ................... 251/298; 251/172; 251/192
[58] Field of Search ............. 251/172, 175, 192, 298, 251/318, 319, 320, 321, 322, 323, 331, 332; 277/168, 169, 212 F

[56] References Cited

U.S. PATENT DOCUMENTS

| | | | |
|---|---|---|---|
| 987,218 | 3/1911 | Cordley | 251/322 |
| 1,983,797 | 12/1934 | Greve | 251/172 |
| 2,151,442 | 3/1939 | Roberts et al. | 251/175 |
| 2,173,949 | 9/1939 | Neveu | 251/86 |
| 2,732,170 | 1/1956 | Shand | 251/172 |
| 2,875,976 | 3/1959 | Harwood | 251/321 |
| 3,252,684 | 5/1966 | Ksieski | 251/172 |
| 3,346,008 | 10/1967 | Scaramucci | 251/332 |
| 3,379,408 | 4/1968 | Lowrey | 251/298 |
| 3,445,087 | 5/1969 | Priese et al. | 251/315 |
| 3,494,589 | 2/1970 | Mumma | 251/298 |
| 3,528,448 | 9/1970 | Urban | 251/315 |
| 3,620,243 | 11/1971 | Zatopek et al. | 251/315 |

FOREIGN PATENT DOCUMENTS

| | | | |
|---|---|---|---|
| 831,862 | 6/1938 | France | 251/172 |
| 1,240,580 | 8/1960 | France | 251/317 |
| 661,532 | 6/1938 | Germany | 251/317 |

*Primary Examiner*—William R. Cline
*Assistant Examiner*—H. Jay Spiegel
*Attorney, Agent, or Firm*—Laurence J. Marhoefer; Lockwood D. Burton; George E. Bodenstein

[57] ABSTRACT

A rotary control valve has a flexible cup-shaped diaphragm ring seat positioned within a valve chamber that has an annular seating lip portion on inner opposite side portions thereof. An annular outer portion of the diaphragm ring is retained against an annular wall of the chamber by an outer portion of a retaining ring member that is longitudinally adjustable along the inner wall of the chamber. The retaining ring has an inner rigid portion that provides a hard seat surface against which one of the annular lips is compressed into sealing, fluid tight engagement as a spherical plug of the rotary valve is simultaneously brought into sealing fluid tight engagement with the other lip. The fluid acting on an inlet side of the valve is applied by way of openings in an annular intermediate portion of the retaining member to the diaphragm ring in a direction that allows the plug and diaphragm ring to make good fluid tight engagement with one another.

5 Claims, 2 Drawing Figures

ROTARY VALVE

This is a continuation of application Ser. No. 522,888, filed Nov. 11, 1974 now abandoned.

BACKGROUND OF THE INVENTION

1. Field of the Invention

The invention relates to improvements in eccentric rotary valve for flow control.

2. Description of the Prior Art

U.S. Pat. No. 3,494,589 discloses a control valve in which the valve plug closure member is movable in a rotatory sense about an axis which is directed rectangularly to the valve housing and which is displaced in relation to the axis of the valve housing. More specifically, the valve comprises a spherical closing face or plug which forms one seating surface of the valve and a ring-shaped valve seat in the valve housing which forms another seating surface. The valve plug is connected with a pivot axis via a flexible arm. The flexible arm provides a limited amount of annular displacement or cocking of the valve to insure complete seating of the spherical closing face with the ring-shaped seat face of the valve housing.

To provide a flexible arm has proved to be disadvantageous insofar as this flexibility of the arm only can be achieved by weakness of the arm. This weakness of the flexible arm comprises the danger of breaking with increasing of operation cycles. A further disadvantage is to be seen in the fact that the pressure of the fluid medium is acting in a sense which is releasing the sealing connection between the valve body and the valve seat. Because of the flexible arm the acting pressure may lift up the valve plug from the valve seat.

SUMMARY OF THE INVENTION

It is a major object of the invention to provide an improved rotary control valve.

It is the further object of the invention to provide a cup-shaped flexible diaphragm ring containing an annular axially directed lip seating portion extending away from each of the opposite sides of an inner diametral portion thereof so that one of the lip seating portions will be compressed into fluid tight sealing engagement with an associated hard seat as an associated spherical plug closing member is simultaneously rotated into sealing engagement with the other opposite annular lip.

It is another object of the invention to provide an improved seat in the form of a flexible diaphragm seating ring having an adjustable hard back-up seat against which a plug of a rotary valve is engaged and disengaged in order to minimize the possibility of an actuator arm associated with the plug from becoming strained and/or broken while the arm moves the plug into and out of a closed position with its seat.

It is a further object of the present invention to provide an improved seat in the form of a flexible diaphragm seating ring and a perforated member for a rotary valve to allow the pressure of a fluid being applied to the inlet side of the valve to be applied in a direction that will assist in the provision of a good fluid tight seal between the plug and the diaphragm seating ring.

In accordance with the present invention, there is provided an annular outer portion of a flexible seat ring held against an annular wall of a tube-shaped valve chamber by an annular part of a retaining ring. A portion of the seat ring adjacent its inner diameter is provided with an annular, axially directed lip that extends from each of its opposite sides. A ring-shaped diaphragm of a cup-shaped configuration forms an intermediate portion of the flexible seat ring that extends between its annular inner and outer portions. The retaining ring has an inner annular part that provides a hard seat surface against which one of the annular lips is compressed into fluid tight sealing engagement as the plug closing member is simultaneously brought into fluid tight sealing engagement with the other opposite annular lip. A portion of the retainer between its outer retaining portion and inner hard seat portion is perforated. This allows the pressure on the inlet side of the valve to be applied to an annular chamber formed between the ring-shaped diaphragm and an adjacent annular wall portion of the retainer ring.

Since the fluid medium on the inlet side of the valve is continuously applied to the aforementioned annular chamber, it will continuously allow the pressure of the fluid medium to be applied to the inlet side of the diaphragm in a direction to improve the sealing connection between the valve plug and its associated seat.

The flexibility which is afforded by the aforementioned flexible seat allows the actuator arm to move the plug into and out of engagement with the seat without requiring the actuating arm to bend as in the prior art.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Detailed Description

Figure 1:
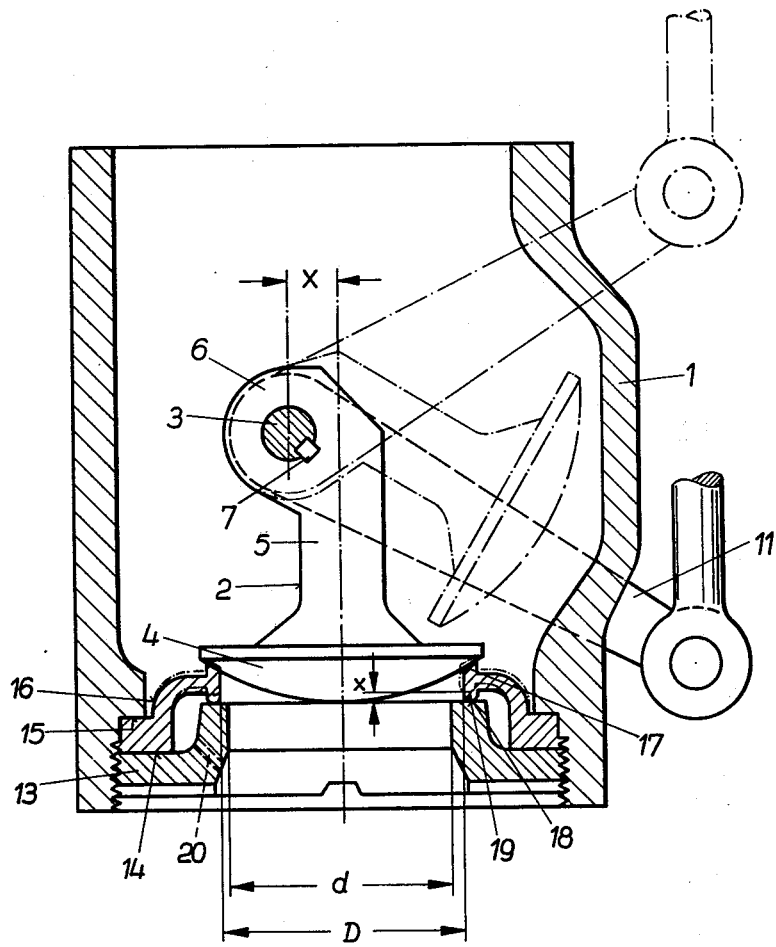
FIG. 1 shows a sectional view along the longitudinal axis of the control valve according to the invention.

For an understanding of the preferred embodiment of the invention, reference will first be made to FIGS. 1 and 2. A tubular-shaped valve housing 1 comprises an axle 3 about which a closure member 2 is movable in a rotatory sense. The axle 3 is directed perpendicularly to the axial surface of the valve housing 1 and is displaced about an amount X with respect to the longitudinal axis of the tubular-shaped valve housing 1. The closure member 2 comprises a plug 4 which has the form of a spherical zone. Two arms 5 connect the plug 4 with two driving collars 6, which collars 6 are retained in fixed relationship with the driving axle 3 via at least one key 7. The driving axle 3 is supported in the valve housing 1 at one side in a blind hole 8 and at the other side in a bearing bushing 9. A gasket ring 10 inserted in the bearing bushing 9 seals the valve housing 1. A lever arm 11 is connected via a key 12 to a part of the driving axle 3 which is projecting out of the bearing bushing 9. The actuation of the lever arm 11 and consequently the closure member 2 may be affected, for instance, by a pneumatic piston drive, not shown.

A threaded connection is provided between a retaining ring member 13 and an inner end portion of the tubular-shaped valve housing 1. A ring-shaped diaphragm 16 is fixed between an annular collar of the retaining threaded ring member 13 and a ring face 15 on the valve housing 1. The ring-shaped diaphragm 16 forms the valve seat. The ring-shaped diaphragm 16 is cup-shaped in its cross-section and comprises at its inner diameter two axially directed lips 17; 18, which extend in opposite directions. The first lip 17 is adjacent to the plug 4 of the valve body 2 and comprises a polished section which is matched to the spherical face of the spherical plug 5. The second lip 18 is in engagement with an annular collar 19 of the threaded ring 13 when the ring-shaped diaphragm 16 is in its solid line position. The inner diameter $d$ of the threaded ring 14 is smaller than the inner diameter $D$ of the valve seat 16. One or several bores 20 extend through the retaining ring member 13 to connect the chamber formed between diaphragm 16 and ring 13 with the inlet side of the valve.

MODE OF OPERATION

Figure 2:
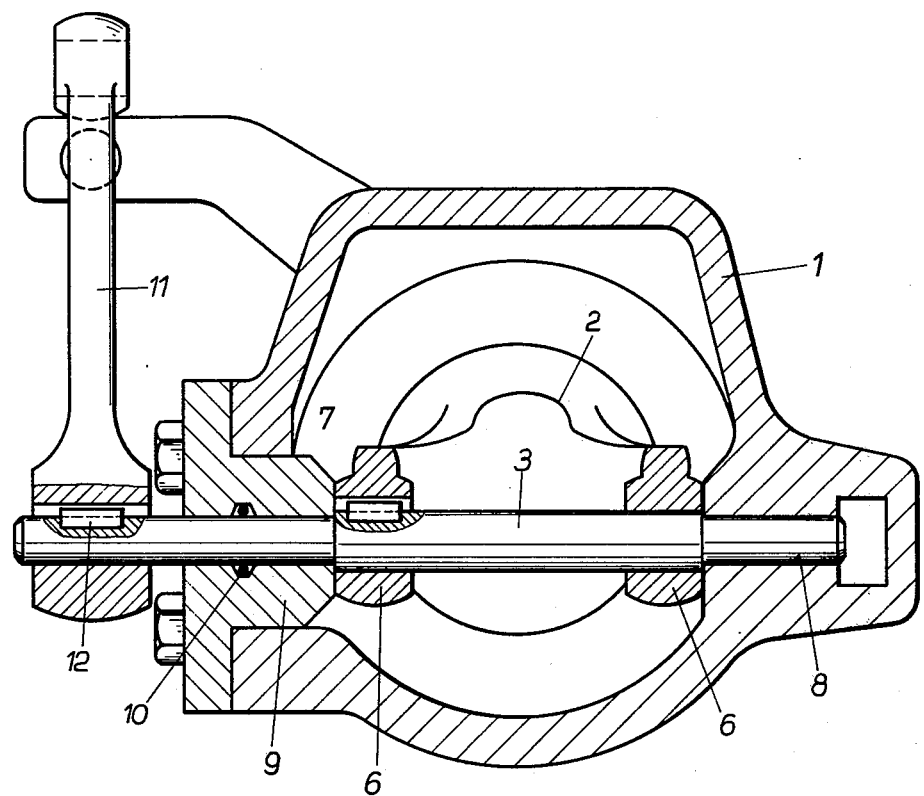
FIG. 2 shows a cross-section of the control valve.

The closure member 2 including its plug 4 shown in FIG. 1 and its driving mechanism 11, 6, 3 and 7 is shown in dotted line form in its opening position whereas the closing position is represented in dash line form. As the closure member 2 is moved from the open dash line position into the closed solid line position the spherical zone 4 of the valve member 2 touches the valve seat 16 at first only partly, as a result of manufacturing tolerances. As the closure member 2 is moved further in a closing direction, the spherical zone of the plug 4 is brought into full engagement with the lip 17 of the ring-shaped diaphragm valve seat 16 whereby a tightened seat is effected against the fluid. The flexible deflection of the lip 18 of the ring-shaped diaphragm valve seat 16 is limited by the hard annular collar portion 19 of the threaded retaining ring member 13. This collar 19 is adjustable in an inner wall of the tubular casing 1 to limit the distance that the lip 17 of the valve seat 16 may be moved in axial direction to the value $x$ as indicated in FIG. 1.

The provision of the aforementioned flexible diaphragm ring type seat for a rotary valve enables the pressure on the inlet side of the valve to act in a positive direction to retain the plug and seat in fluid tight relationship with one another. The provision of the aforementioned flexible diaphragm ring type seat further allows an actuator arm to move a spherical-shaped plug of a rotary valve continuously into and out of engagement with a valve seat without any harmful bending or breaks occurring in this arm.

The embodiments of the invention in which an exclusive property or privilege is claimed are defined as follows:

1. A rotary control valve comprising
    a valve housing having a longitudinal axis, a fluid inlet, and a fluid outlet,
    an axle in said housing having an axis which is at right angles to and is laterally displaced from said housing axis,
    a plug mounted on said axle for rotation therewith within said housing, said plug having a spherical sealing surface which is rotated about said axis of said axle upon the rotation of said axle,
    a flexible seat ring located in said housing between said inlet and said outlet, said seat ring having an annular outer portion having an axis coinciding with said housing axis and having an annular intermediate diaphragm portion of cup-shaped cross-section which extends from said outer portion substantially in the direction of the said axis of said outer portion and turns through substantially a right angle to terminate in two oppositely-directed annular lips which extend substantially at right angles to said diaphragm portion and parallel to said axis of said outer portion, and
    an annular retaining ring having an annular outer collar portion and having an annular inner collar portion constituting a hard seat portion, said outer collar portion being secured in said housing concentrically with said housing axis to secure therein said outer portion of said seat ring with one of said annular lips facing said axle, and with the other of said annular lips facing said hard seat portion,
    whereby rotation of said plug which brings said spherical sealing surface into contact with said one of said annular lips establishes sealing engagement between the latter and said spherical sealing surface, and brings said other of said annular lips into sealing engagement with said hard seat portion, thereby to seal said inlet from said outlet.

2. A valve as specified in claim 1, wherein the surface of said one of said annular lips which engages said spherical sealing surface of said plug is shaped to match the surface of said spherical sealing surface.

3. A valve as specified in claim 1, wherein an annular chamber is formed between said retaining ring and said seat ring, and wherein said retaining ring is provided with fluid passage means extending between said chamber and said inlet for causing fluid in said inlet to urge said one of said annular lips into said sealing engagement with said spherical zone of said plug.

4. A valve as specified in claim 1, wherein said outer collar portion of said retaining ring is secured in said housing by screw thread means to permit the adjustment of said hard seat portion of said retaining ring along said housing axis.

5. A valve as specified in claim 4, wherein the adjusted position of said hard seat portion of said retaining ring along said housing axis establishes clearance between said hard seat portion and said spherical sealing surface of said plug when the latter seals said inlet from said outlet.

* * * * *